United States Patent [19]

Matros et al.

[11] Patent Number: 5,401,479
[45] Date of Patent: Mar. 28, 1995

[54] PROCESS FOR THE REMOVAL OF NITROGEN OXIDES FROM OFF-GASES

[75] Inventors: Jury S. Matros; Alexandr S. Noskov; Ljudmila N. Bobrova; Elena M. Slavinskaya, all of Novosibirsk, Russian Federation

[73] Assignee: Institut Kataliza Imeni G.K. Boreskova Sibirskogo Otdelenia Rossiiskoi Akademii Nauk, Russian Federation

[21] Appl. No.: 906,918

[22] Filed: Aug. 21, 1992

[51] Int. Cl.$^6$ .............................. B01J 8/00; B01J 8/02
[52] U.S. Cl. .................................................. 423/239.1
[58] Field of Search ................. 423/239.1; 165/97, 909

[56] References Cited

U.S. PATENT DOCUMENTS

| | | | |
|---|---|---|---|
| 3,653,833 | 4/1972 | Watson et al. | 23/226 |
| 4,199,554 | 4/1980 | Araki et al. | 423/239 |
| 4,268,488 | 5/1981 | Ginger | 423/239 |
| 4,719,094 | 1/1988 | Rieckert et al. | 423/239 |
| 4,810,476 | 3/1989 | Ohlmeyer et al. | 423/239 |

OTHER PUBLICATIONS

McCabe Smith et al. *Unit Operations of Chemical Engineering* 1985 (pp. 617–619).
Olsen, John; *Unit Processes & Principles of Chemical Engineering;* Jul. 1932 (pp. 1–3).
Nitrogen Industry Worker's Handbook, Zhavoronkov N. I. et al., 1986, "Khimiya" Publishers, Moscow, vol. 1, pp. 220–221.
Deggin, D., Poller, J., und Weinzierl, K. "Die Bedeutung der Chemietechnik für fortgeschrittene Technologien zur Stromerzeugung" Chem.-Ing.-Tech. 59 (1987) Nov. 8, S.629–636, pp. 629–636.

*Primary Examiner*—Gary P. Straub
*Assistant Examiner*—Thomas G. Dunn, Jr.
*Attorney, Agent, or Firm*—Ladas & Parry

[57] ABSTRACT

The present invention relates to a process for the purification of off-gases containing nitrogen oxides. An off-gas is passed through a reactor in admixture with ammonia or an ammonia precursor over a plurality of spaced catalyst beds under conditions to reduce the nitrogen oxides to nitrogen gas while heat is liberated. After the gas stream has obtained a desired temperature, the gas flow is reversed.

14 Claims, No Drawings

PROCESS FOR THE REMOVAL OF NITROGEN OXIDES FROM OFF-GASES

This application is a continuation of copending International Application PCT/SU90/00212, filed on Aug. 31, 1990, now abandoned.

1. Field of Art

The present invention relates to processes for purification of off-gases containing nitrogen oxides so as to deal with the problems of atmospheric pollution from toxic contamination by nitrogen oxides ($NO_x$). The present invention is applicable to the neutralization of nitrogen oxides in the off-gases resulting from various production processes.

2. State of Art

A number of processes for purification of off-gases to remove nitrogen oxides are known in the art. These processes are based either on absorption of nitrogen oxides by liquid absorbents, or on their conversion (reduction) into harmless compounds (water vapor and nitrogen). The most widely employed processes for reduction of nitrogen oxides use ammonia (so-called selective catalytical reduction - SCR). The SCR processes make it possible to carry out the reduction of nitrogen oxides to elemental nitrogen and water vapor in the presence of oxygen contained in the off-gases. The SCR processes are carried out either in a bed of granular catalyst, or with the use of honeycomb block-type catalysts. The reactions for the reduction of nitrogen oxides are conducted at a temperature above the temperature at the beginning of the reaction so as to exclude the formation of ammonium salts. The accumulation of salts in considerable amounts can result, due to their subsequent decomposition, in deterioration of the catalyst and reduction of its service life. These constraints make it necessary to maintain the gas temperature at the inlet of the catalyst bed equal to at least 180° C. Ammonia is introduced into the gases being treated, the gases having been heated to a temperature within the range of from 180° C. to 320° C., immediately before passing the mixture to the catalyst bed (Handbook of Nitrogen Industry Worker, Zhavoronkov N. I. et al., 1986, "Khimiya" Publishers, Moscow, vol. 1, p. 220–221).

Frequently, the temperature of the off-gases containing nitrogen oxides does not exceed 40°–50° C. This takes place after an absorption purification of the gases from nitrogen oxide, or after a wet sulphur purification of flue gases. To carry out a SCR process, the off-gases must be heated to the reaction initiation temperature. The gases being purified can be heated by means of mixing with hot flue gases, or by the recovery of the heat of the purified off-gases in heat-exchanging apparatus.

The heated gas being purified is mixed with ammonia, whereafter the mixture is passed through a catalyst bed, wherein a further elevation of temperature occurs as a result of the heat of the reaction between nitrogen oxides and ammonia. Then the hot purified gas is passed through a heat-exchanger wherein it gives its heat to the initial gas being purified. The cooled purified gas leaving the heat-exchanger is vented to the atmosphere (Chemie-Ingienier-Technik, 1987, Bd. 59, N8, D. Degin, J. Poller, K. Weinzierl. Die Bedeitung der Chemietecnik fur fortgeschritene Technologien zur Stromerzeugung, ss. 629–636).

The realization of this process necessitates the availability of sophisticated and cumbersome heat-exchanging means and considerable rates of consumption of an additional fuel for heating of the feed being purified. Furthermore, in carrying out this process difficulties appear in maintaining high degrees of purification when concentrations of nitrogen oxides in the gases being neutralized vary. An increase in the volume of the off-gases can result in cooling of the regions of the catalyst bed adjacent to the gas inlet area and deposition of ammonium salts thereon which consequently reduces catalyst service life to 12–16 months. As a result of a low concentration of nitrogen oxides ($NO_x$) the content of the residual ammonia in the purified gas might increase due to decreasing temperature and a shift of the stoichiometric ratio between nitrogen oxide and ammonia. In SCR processes carried out on a commercial scale, accumulation of ammonium salts due to the reaction between the residual nitrogen oxides and ammonia in the regions of the gas ducts with a low temperature is observed. To avoid accumulation of ammonium salts in considerable amounts, additional washing of the gas ducts is usually performed.

SCR processes for the removal of nitrogen oxides from off-gases result in an insufficiently high degree of purification (usually not over 90–95%). The reasons for such low degrees of purification are an insufficient intermixing of the introduced reducing agent (ammonia) with the off-gas and insufficiently high temperatures within the catalyst bed, wherein nitrogen oxides enter into reaction with ammonia.

Therefore, the removal of nitrogen oxide from off-gases by known catalytical processes does not at the present time, facilitate the achievement of high technical and economic parameters of the process due to the high power consumption for carrying out these processes, a reduced service life of the catalyst and insufficient purification.

DISCLOSURE OF THE INVENTION

The present invention is directed to a process for the removal of nitrogen oxides from off-gases which would ensure a high degree of purification on the order of 99% irrespective of variations in the concentration of nitrogen oxides in the off-gas and at minimum power consumption, a long service life of the catalyst, and the substantial absence of ammonia in the purified gases.

This object is accomplished by passing the off-gases through a reactor in the presence of ammonia or a precursor thereof at a temperature within the range of from 180° C. to 600° C. to give a purified gas wherein, according to the present invention, the reactor comprises at least two adjacent spaced catalyst beds with an intervening space free of catalyst between the adjacent beds and ammonia or a precursor thereof is introduced in the space between the adjacent beds and admixed with the off-gas after the off-gas has passed through at least one of said beds in the reactor, said admixture then passing through at least the next adjacent bed, and when the gas mixture at a point which is at a distance from the point of introduction of the off-gas into the reactor equal to 10–90% of the total length of the reactor, the gas mixture has attained a temperature in the range of 30° C. to 400° C., the direction of flow is reversed.

Nitrogen oxides are formed in the production of nitric acid, combustion of different kinds of fuel and in some other industrial processes. Their content in the off-gases ranges from −10 g/m³ (after absorption in the production of nitric acid) to 0.6–1.5 g/m³ (in combustion of a fuel).

Water vapor is also present in the off-gases in addition to nitrogen oxides. In certain cases the content of water vapor corresponds to the pressure of a saturated water vapor at a temperature of 20° C. to 40° C. Due to the interaction of nitrogen oxides, ammonia and water vapor at a temperature of less than 180° C. ammonium salts (ammonium nitrites and nitrates) can form and accumulate. The subsequent decomposition of ammonium salts frequently is extensive and can have a detrimental effect on the performance of the catalyst. For this reason, the process of purification of the off-gases by removing nitrogen oxides should be conducted at a temperature of not lower than 180° C.

In addition to the reaction of $NO_x$ with ammonia (reduction of nitrogen oxides) on catalysts suitable for carrying out SCR processes, oxidation of ammonia by oxygen contained in the off-gases also occurs. At a temperature below 350°–500° C. the rate of the reaction of oxidation of ammonia is considerably less than the rate of its interaction with $NO_x$. At a temperature of above 600° C. a greater portion of ammonia will be oxidized by oxygen and will not react with nitrogen oxides which could result in a reduction in the degree of purification. Therefore, the temperature range of 180° C. to 600° C. of the catalytical process for the removal of nitrogen oxides from off-gases using ammonia is optimal for nitrogen oxide-containing gases formed in a number of different production processes.

Examples of catalysts useful for purification of the off-gases by reduction of nitrogen oxides are those based on precious metals, e.g. palladium; or oxide catalysts having as their active component oxides of vanadium, iron, copper, zinc and other metals or mixtures thereof.

Catalysts for reduction of nitrogen oxides with ammonia are, as a rule, formed of granules of different shapes (sphere, cylinder, ring) or of blocks with a honeycomb structure. The use of honeycomb-structure blocks considerably lowers the hydraulic resistance of the catalyst bed (by 10–100 times).

Reducing agents for nitrogen oxides can include gaseous ammonia or a derivative of ammonia, for example, ammonium water or an aqueous solution of urea.

As mentioned hereinbefore the reactor is divided into at least two adjacent spaced beds with an intervening space substantially free of catalyst between the adjacent beds and ammonia or a precursor thereof is introduced in the space between the adjacent beds, and is mixed with the off-gases which have first passed through at least one of the catalyst beds, said admixture then passing through at least the next adjacent bed. The reaction of ammonia with nitrogen oxides on the catalyst results in the evolution of some heat. As a result, a temperature profile is formed, which moves through the catalyst bed in the direction of flow of the gas being purified. The propagation of the liberated heat along the catalyst bed results in heating of the regions of the catalyst bed adjacent to the outlet of the purified gas. If a gas mixture is passed for quite a long time in one direction, the catalyst bed will liberate the heat accumulated in it and a temperature equal to the inlet temperature will prevail along the entire length of the catalyst bed with the result that the degree of removal of nitrogen oxides will become substantially equal to zero. In order to retain the heat released during the reduction reaction the direction of flow of the gas being purified through the catalyst bed is reversed. The reversal of the direction of flow of the gas being purified is generally carried out when the gas mixture reaches a temperature in the range of about 30°–400° C. at a specified distance from the point of inlet of the off-gas into the reactor within the range of 10 to 90% of the total length of the reactor.

After the reversal in the direction of flow of the gas being purified, the heat accumulated in the catalyst bed regions adjacent the outlet (formerly the inlet) is employed for heating the incoming off-gas. After the heating of the gas by contact with the hot catalyst, a reducing agent (ammonia or a precursor thereof) is introduced. The gas mixture is then passed through the subsequent parts of the reactor and heat liberated by the reduction reaction accumulates in the previously cooled regions of the reactor. In this manner, by periodically reversing the direction of flow of the off-gas in the reactor, it is possible to maintain, at a relatively low inlet temperature of the off-gas (e.g. of 20°–50° C.) and an outlet temperature of the purified gas (usually 30°–400° C.), a required temperature in the central portion of the reactor for an effective performance of the SCR process (i.e. 180°–600° C.).

It is the most advantageous to introduce the ammonia in a zone of maximum temperature. This makes it possible to substantially eliminate the formation of ammonium salts. For this purpose, the reactor should be preferably divided into two equal parts or in close volume proportions and ammonia introduced between these parts.

One of the reasons for a reduced service life of the catalyst is variation in temperature in some regions of the reactor which can result in a local deposition of ammonium salts. It has been experimentally found that upon a periodic reversal of the direction of flow of the off-gas, the time of the formation of such regions is equal to several hours. During the time the gas being purified flows in one direction (usually not longer than 60 minutes), the temperature drops in the regions of the reactor that have not had time to reach their maximum temperature with a corresponding reduction in purification in those regions. The intermixing of the flowing gases containing nitrogen oxides with ammonia in the space between the catalyst beds generates heat and eliminates the temperature drop in different points of the catalyst bed cross-section which were formed in the previous direction of flow of the gas being purified.

From a processibility standpoint, it is preferable to divide the reactor into three or four parts. However, as the number of parts of the reactor is increased, the hydraulic pressure is increased, the circuit of introduction of ammonia becomes more complicated and, the aerodynamic conditions are impaired since the length of individual catalyst beds becomes small and it is very difficult to ensure uniformity of the gas flow in such catalyst beds. If these process difficulties could be eliminated, the number of catalyst beds would be generally unrestricted.

The creation of optimal temperature conditions of operation of the reactor and prevention of overheating or cooling of the reactor with the flow rate and composition of the off-gas fluctuating with time is achieved by periodically reversing the direction of flow of off-gas when the gas mixture attains a predetermined temperature (30°–400° C.) at a fixed distance from the point of introduction of the off-gas into the reactor in the range of from 10 to 90% of the total length of the reactor.

The lower limit of the above-specified temperature range of the gas mixture corresponds to the temperature of the off-gas close to its introduction into the reactor, that is after it passes through 10% of the total length of the reactor. The upper limit of the gas mixture temperature corresponds to the temperature it achieves close to its exit from the reactor, that is after it passes through 90% of the total length of the reactor. Where the temperature of the gas mixture exceeds 400° C. because of the heat obtained from the reactor, the degree of purification by the reaction is lowered.

To accumulate heat and create the best conditions for distribution of the gas mixture over the cross-section of the reactor, it is advisable that a gas-permeable mass of an inert material be positioned in the spaces between the catalyst beds. Such materials include, for example, ceramic or porcelain Raschig rings, or crushed quartz. The inert material also prevents the catalyst from cooling during the purification process, extending its service life.

The off-gases from production processes have varying contents of nitrogen oxides and the heat evolved as a result of their interaction with ammonia may be insufficient for the creation, in the catalyst bed, of a temperature zone necessary for a significant conversion of nitrogen oxides. In this case it is advisable to pass the off-gases through the reactor in the presence of a hydrocarbon fuel employed in an amount of up to 5 kg per 1,000 $m^3$ of the off-gas. The fuel components are oxidized on the catalyst, liberating heat, and ensuring the required level of temperature for the reduction reaction. A fuel consumption rate over 5 kg/1,000 $m^3$ of the off-gas is inexpedient, since it results in higher rates of power consumption and overheating of the catalyst. Such fuels can include, for example, vapor of solvents (acetone, xylene), combustible gases (propane, butane), or kerosene vapor.

As compared to known catalytical processes, the process for removal of nitrogen oxides from off-gases according to the present invention makes it possible to increase the degree of purification of gases up to 98–99.9 percent, to extend the life of the employed catalysts by 30–60 percent and to considerably lower the power consumption for the purification process. As compared to the known methods, the process according to the present invention is simple as regards the procedure and equipment employed and is applicable to purification of gases irrespective of the considerable variation in volumes of the gases or in the concentrations of nitrogen oxides therein. According to the process of this invention, the purification is carried out in a single apparatus without using any special heat exchange equipment, thus reducing metal-intensity of the production units by 2–5 times as compared to conventional processes. An effective use of the heat from chemical reactions in the process according to the present invention makes it possible to avoid fuel consumption for pre-heating of the off-gas with a temperature of 5°–150° C.

The use of the process according to the present invention makes it possible to neutralize excess (as compared to the stoichiometrically required) ammonia which occurs as a result of decreasing the off-gas volume or lowering concentrations of nitrogen oxide in the off-gas. This virtually eliminates the appearance of ammonia at the outlet. The process according to the present invention ensures observance of the requirements of the modern sanitary norms regarding the degree of removal of nitrogen oxides from the off-gas and the content of ammonia in the purified gas. The process according to the present invention makes it possible to ensure the required degree of purification using various types of catalysts suitable for carrying out SCR processes.

The process for the removal of nitrogen oxides from off-gases according to the present invention is simple and can be performed in the following manner.

The purification is effected in a reactor containing at least two adjacent spaced catalyst beds. Before the beginning of purification, the reactor is heated to the temperature of initiation of the reaction between nitrogen oxide and ammonia or a derivative thereof. The off-gas is passed through the reactor at a speed sufficient to heat it as a result of contact with the catalyst. After passing through one or more catalyst beds of the reactor the gas being purified has been heated to a temperature at which the reaction of nitrogen oxides with ammonia occurs at a high speed. Then, ammonia is introduced into the space between the adjacent catalyst beds in a stoichiometrically required amount. The introduction of ammonia is effected, for example, by purging into a perforated tube or through a distribution tubular grate. After mixing of the off-gases with ammonia the mixture is passed through one or more subsequent catalyst beds. The gaseous mixture reacts on the catalyst, liberating heat. The liberated heat warms up the regions of the catalyst bed adjacent to the outlet of the purified gas from the reactor. The purified gas is vented to the atmosphere.

The temperature of the off-gas changes as it is passed through the reactor. First it is heated and then reacted with ammonia, liberating heat, and finally it is cooled by transferring its heat to the catalyst. When the gas mixture reaches a temperature of 30°–400° C. at a distance of 10–90% of the total length of the reactor from the inlet point of the off-gas, the direction of flow of the gas being purified is reversed by a switching-over means or with the help of a system of gas valves. In so doing, the catalyst bed or beds formerly acting as outlet bed or beds become inlet parts. The heated parts of the reactor (one or more) serve to preheat the off-gas. After introduction of ammonia between the adjacent catalyst beds the mixture of ammonia with the off-gas is passed sequentially through one or more catalyst beds, wherein the gas is purified by removal of nitrogen oxides. Thereafter, the purified gas is vented to the atmosphere. The direction of flow of the off-gas is again reversed on attainment of a given temperature (30°–400° C.) by the gas mixture at a selected distance (10–90% of the total length into the reactor). Further purification steps are effected by regularly reversing the direction of flow of the gas being purified through the reactor.

When using an inert material, such material is placed in the spaces between catalyst beds, i.e. on a fire grate. Ammonia is fed directly into the inert material and the process is further conducted as described hereinabove.

At a concentration of nitrogen oxides of, for example, from 0.7 to 2.0 g/$m^3$ the purification of the off-gases is preferably conducted in the presence of a hydrocarbon fuel. The hydrocarbon fuel can be introduced either together with off-gases or between the adjacent catalyst beds.

For a better understanding of the present invention, some specific Examples are given hereinbelow.

EXAMPLE 1

An off-gas with a concentration of nitrogen oxides of 6 g/m$^3$ was passed into a vertically disposed reactor loaded with a bed of granular vanadium oxide catalyst to a total depth of 1.0 m. The catalyst zone in the reactor consisted of two spaced beds of 0.5 depth each. The temperature of the off-gas was 10° C., the linear speed at the inlet of the reactor was 0.6 m/s. The reactor was previously heated to a temperature of 220° C.

The gas containing nitrogen oxides was passed through the first catalyst bed. In the space between the beds gaseous ammonia was introduced by means of a system of distribution tubes in a stoichiometrically required amount. After mixing, the obtained gas mixture was passed through the second catalyst bed, wherein purification to remove nitrogen oxides was carried out.

The purified gas was vented to the atmosphere. The purification of the gas was carried out at a temperature of 180° C. to 400° C. in the catalyst bed. When the gas mixture reached a temperature of 30° C. at a distance of 0.1 m (10% of the total length of the reactor) from the point of introduction of the off-gas into the reactor, the direction of flow of the gas was reversed. The degree of purification of the off-gas was 99.5%. The residual content of ammonia in the purified gases was 10 ppm.

EXAMPLE 2

An off-gas to be purified contained 1.5 g/m$^3$ of nitrogen oxides. The catalyst comprising vanadium pentoxide, titanium dioxide and noble metals had a block-shape with through channels. The reactor consisted of three beds of 0.5 m depth with beds of an inert material (porcelain Rasebig rings of 15×15×3 mm size) positioned thereinbetween. The catalyst beds and beds of the inert material were preheated to a temperature of 300° C.

The off-gas temperature at the point of introduction to the reactor was 50° C., and the gas speed was 0.5 m/s. The off-gas was first mixed with a hydrocarbon fuel (propane) in the amount of 0.5 kg per 1,000 m$^3$ of the off-gas. The resulting mixture was passed through the first catalyst bed and through the bed of an inert material, whereinto by means of nozzles a 25% aqueous solution of urea was introduced in an amount equal to half of that stoichiometrically required. The resulting mixture was passed through the second catalyst bed, wherein a partial purification was effected to remove nitrogen oxides simultaneously with oxidation of a hydrocarbon fuel, and then through the second bed of an inert material, wherein there occurred intermixing with the remaining amount of the stoichiometrically required reducing agent (a 25% aqueoussolution of urea).

While passing through the remaining catalyst bed, the off-gas was finally purified to remove nitrogen oxides and fuel components, whereafter it was vented to the atmosphere. The temperature at which the gas was purified to remove nitrogen oxides was 300°–450° C. The direction of flow was reversed when the gas mixture reached a temperature of 300° C. at the distance of 33% of the total length of the reactor from the point of introduction of the off-gas to the reactor. The degree of purification was 98%. The residual content of ammonia in the purified gas was 2–3 ppm.

EXAMPLE 3

An off-gas with a concentration of nitrogen oxides of 10 g/m$^3$ was fed into a reactor loaded with a vanadium oxide catalyst divided into two beds of 0.4 m depth each, between which an inert material (ceramic Rasebig rings of 25×25×4 mm size) was placed. The off-gas temperature was equal to 20° C., the linear speed at the point of introduction to the reactor was 0.7 m/s. The catalyst bed and the inert material bed were preheated to a temperature of 240° C. The off-gas was passed through the first catalyst bed and fed onto the bed of an inert material, whereinto evaporated ammonia water was introduced through a perforated distribution plate in a stoichiometrically required amount. The resulting vapor gas mixture was passed through the second catalyst bed, wherein purification to remove nitrogen oxides was carried out. The temperature at which the purification of the gas occurred was 400°–600° C. The purified gas was vented to the atmosphere. The direction of flow of the off-gas was reversed when the gas mixture reached a temperature of 400° C. at the distance of 0.6 m (75% of the total length of the reactor) from the introduction of the off-gas into the reactor. The degree of purification was 99%. The residual content of ammonia in the purified gas was equal to 1–2 ppm.

EXAMPLE 4

An off-gas to be purified contained 0.6 g/m$^3$ of nitrogen oxides and had a temperature of 30° C. The off-gas was mixed with a hydrocarbon fuel (kerosene vapor) in the amount of 5 kg per 1,000 m$^3$ of the off-gas and fed at the linear speed of 1 m/s into a reactor loaded with granular iron-chromium catalyst in the shape of rings 25×25×4 mm size. The reactor was separated into two equal beds of 0.8 m depth each and preheated to a temperature of 350° C. The mixture of the off-gas with the hydrocarbon fuel was passed through the first catalyst bed, wherein the hydrocarbon fuel was oxidized, liberating heat. Then gaseous ammonia was introduced in a stoichiometrically required amount by means of a system of gas-distribution tubes. After mixing, the gas mixture was passed through the second catalyst bed, wherein it was purified to remove nitrogen oxides. The purified gas was vented to the atmosphere. The purification of the gas was effected at a temperature within the range of from 400° C. to 550° C.

When the gas mixture reached a temperature of 400° C. at a distance of 1.44 m (90% of the total length of the reactor) from the point of introduction of the off-gas into the reactor, the direction of flow of the off-gas was reversed. The degree of purification of the gas was 99.9% and the content of ammonia in the purified gas was 1 ppm.

INDUSTRIAL APPLICABILITY

The present invention can be useful in industry for neutralization of the nitrogen oxides in the off-gases resulting from various industries.

We claim:

1. A process for removing nitrogen oxides from a cold off-gas containing said nitrogen oxides, said cold off-gas being cooler than the temperature in a central portion of the reactor, which comprises:

passing said off-gas in admixture with ammonia or an ammonia precursor through a reactor under conditions so as to reduce the nitrogen oxides to nitrogen gas while heat is liberated, wherein the reactor comprises a plurality of adjacent spaced catalyst beds with an intervening space between said adjacent beds and wherein the off-gas is passed sequentially through said beds and the ammonia or ammonia precursor is first admixed with off-gas in the space between adjacent beds, and resulting admixture passing through at least a portion of the next adjacent bed, said process including maintaining a central portion of the reactor at a temperature in the range of 180° C. to 600° C. by periodically reversing the direction of flow of the off-gas through said reactor between respective ends of said reactor by taking a temperature measurement at a distance from the point of introduction of the off-gas of 10% to 90% of the total length of the reactor, and when said temperature reading indicates a temperature of the admixture at said distance, of between 30° C. to 400° C. as a result of the heat of reaction of the nitrogen oxides with the ammonia or ammonia precursor, reversing the direction of flow;

after a reversal of flow, a first part of the reactor through which off-gas flows has retained heat from a previous reaction with ammonia or ammonia precursor, said retained heat being liberated to heat said off-gas then being introduced into the first part of the reactor.

2. A process according to claim 1, wherein said catalyst beds comprise a noble metal which is Pd or an oxide of a transition metal which is V, Fe, Cu, Zn or a mixture thereof.

3. A process according to claim 1, wherein a gas-permeable mass of an inert material is positioned in the space between adjacent catalyst beds.

4. A process according to claim 3, wherein the reactor comprises two catalyst beds.

5. A process according to claim 3, wherein said reactor comprises at least three catalyst beds.

6. A process according to claim 3, wherein said inert material comprises crushed quartz or Raschig rings.

7. A process according to claim 1, wherein said precursor of ammonia is urea.

8. A process according to claim 1, wherein said off-gas is passed through the reactor in the presence of a hydrocarbon fuel employed in an amount of up to 5 kg per 1,000 $m^3$ of the off-gas.

9. A process according to claim 1, wherein prior to passing the off-gas into the reactor, the reactor is pre-heated during a start-up operation to a temperature sufficient to initiate the reaction of the nitrogen oxides with the ammonia or precursor thereof.

10. A process according to claim 1, wherein the off-gas first passed to one of said beds is at a temperature that an interaction of said off-gas with said ammonia or precursors thereof would cause the formation of ammonium salts.

11. A process according to claim 1, wherein the off-gas when first introduced into the reactor has a temperature in the range of the 5°–150° C.

12. A process according to claim 1, wherein the off-gas first passed to one of said beds is at a temperature that an interaction of said off-gas with said ammonia or precursors thereof would cause the formation of ammonium salts.

13. A process according to claim 1, wherein the off-gas when first introduced into the reactor has a temperature in the range of the 5°–150° C.

14. A process according to claim 7, wherein the off-gas when first introduced into the reactor has a temperature in the range of the 5°–150° C.

* * * * *